S. K. DENNIS.
CORN PLANTER.
APPLICATION FILED MAY 4, 1911.
1,005,172.
Patented Oct. 10, 1911.
2 SHEETS—SHEET 1.
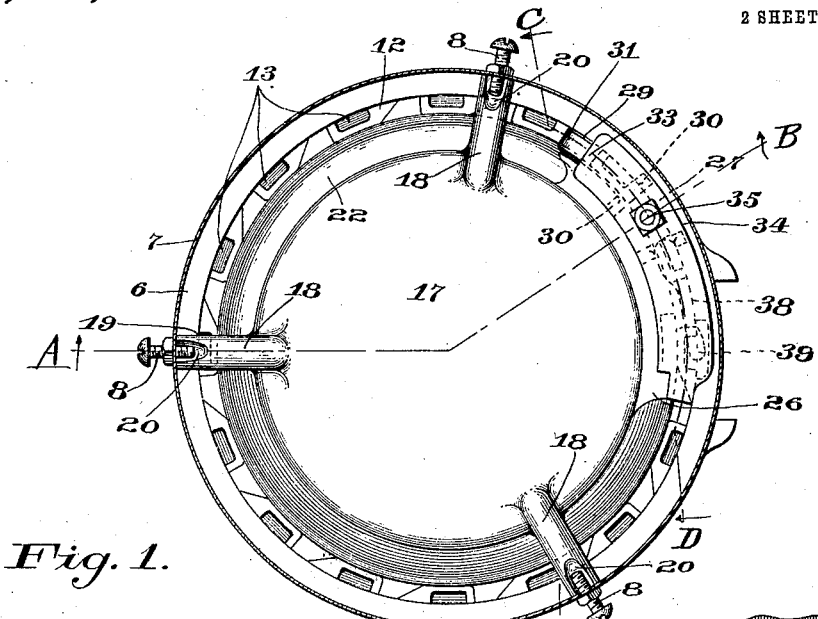
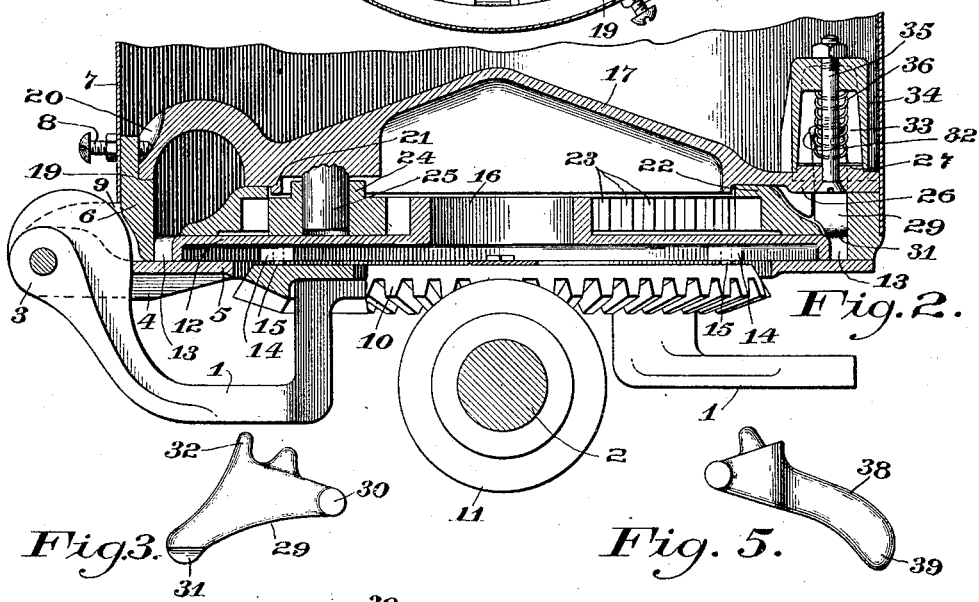
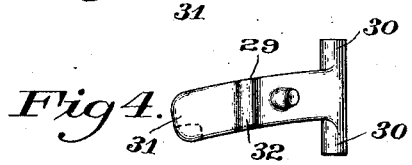
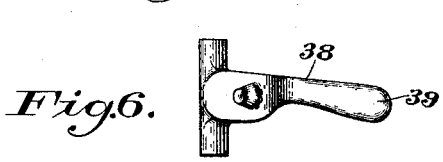
Witnesses:
C. C. Palmer
F. W. Hoffmeister
Inventor.
Samuel K. Dennis
By E. W. Burgess
Attorney.

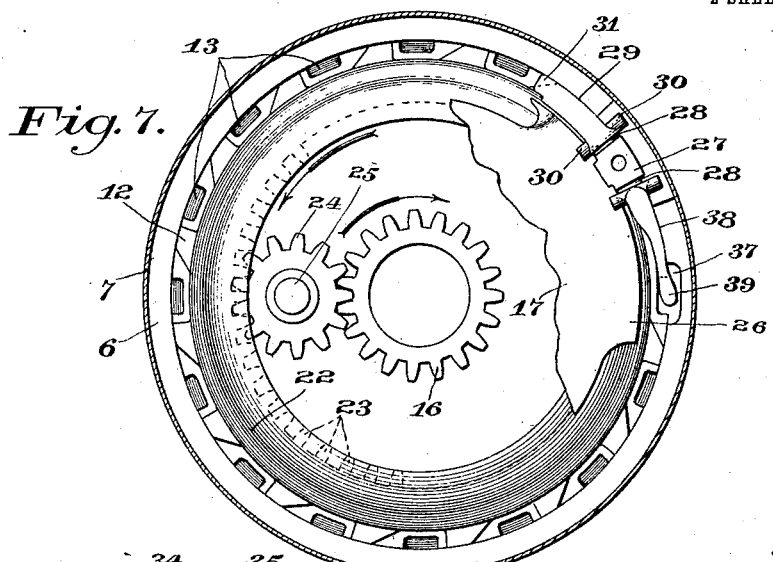
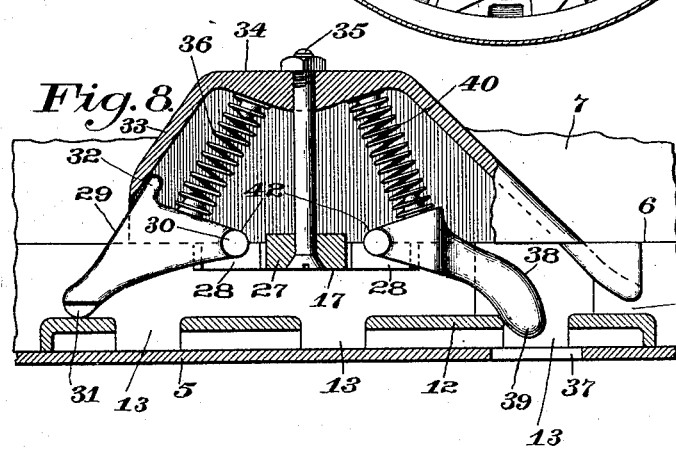
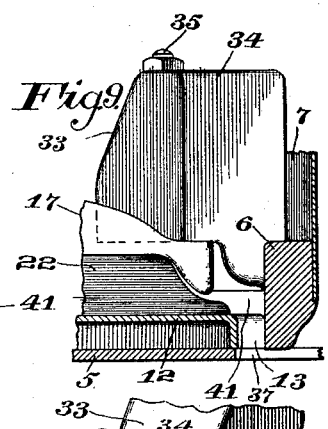
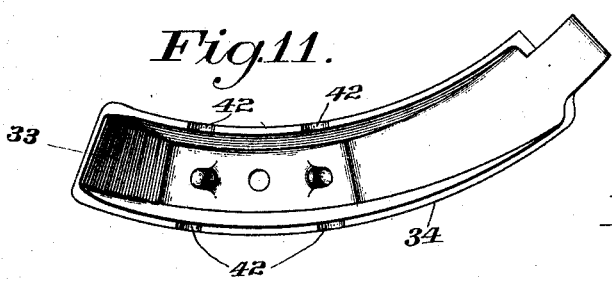
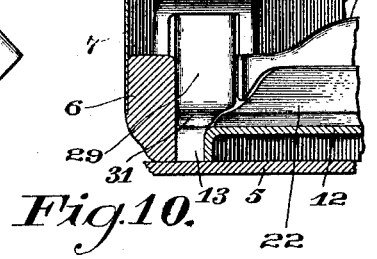

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

CORN-PLANTER.

1,005,172.      Specification of Letters Patent.      Patented Oct. 10, 1911.

Application filed May 4, 1911. Serial No. 624,951.

*To all whom it may concern:*

Be it known that I, SAMUEL K. DENNIS, a citizen of the United States, residing at Chicago, in the county of Cook and State of Illinois, have invented certain new and useful Improvements in Corn-Planters, of which the following is a specification.

My invention relates to corn planters, and in particular to the construction of the seed dropping mechanism whereby the seed is allowed to fall into the cells in the seed plate in a regular and reliable manner, to means for agitating the mass of seed in a manner to prevent its becoming wedged in the seed receiving channel leading to the seed cells, and to improved cut-out and seed ejecting mechanism for insuring a proper delivery of the corn to the seed conduit leading to the furrow; the object of my invention being to provide a seed delivery mechanism that will be both reliable and accurate in its operation. This object I attain by means of the mechanism illustrated by the accompanying drawings, in which—

Figure 1 represents a top plan view of the lower part of a seed hopper for corn planters having my invention forming a part thereof; Fig. 2 is a sectional vertical elevation on an enlarged scale of Fig. 1, on line A—B; Fig. 3 is a side elevation of the seed cut-out finger; Fig. 4 is a perspective view of Fig. 3; Fig. 5 is a side elevation of a seed ejecting finger; Fig. 6 is a view in perspective of Fig. 5; Fig. 7 is a top plan view of part of the seed delivering mechanism having part of the cover plate and the cut-out and ejecting mechanism removed; Fig. 8 is a detached sectional vertical elevation on an enlarged scale of part of Fig. 1, on line C—D, and designed to illustrate the operation of the cut-out and seed ejecting mechanism; Fig. 9 represents a side elevation, partly in section, of part of Fig. 8, illustrating the operation of the ejecting mechanism; Fig. 10 represents a similar view showing the position of the cut-out finger; and Fig. 11 represents a view in perspective of the removable box-like cage in which the cut-out and seed ejecting mechanism is mounted.

The same reference characters designate like parts throughout the several views.

1 represents a seed hopper supporting base having an operating shaft 2 journaled therein, the base being provided with a hinge member 3, to which is pivotally connected a hinge member 4 forming part of an annular plate 5, upon which rests an annular ring 6 that is connected with the bottom portion of the walls of the cylindrical sheet metal seed hopper 7 by means of screws 8, the ring being provided with hinge members 9 that are pivotally connected with the base hinge member 3 coaxially with the plate 5.

10 represents a bevel gear wheel journaled upon the base member 1, and 11 a pinion secured to the operating shaft and meshing with gear wheel 10 and transmitting motion thereto.

12 represents a seed plate supported upon the annular plate 5, rotatable within the ring 6 and having seed receiving cells 13 upon its periphery that are adapted to receive single kernels of corn on edge, downward extending ribs 14 upon its lower surface that are adapted to engage with bosses 15 upon the bevel gear wheel in a manner to be rotated therewith, and a spur pinion 16 integral therewith.

17 represents a cover plate having radially extending arms 18 that engage with shoulder portions 19 upon the annular ring 6 in a manner to support the cover plate, and the inner ends of the screws 8 engage with downwardly and outwardly inclined surfaces 20 upon the outer ends of the arms in a manner to secure the cover plate in position. The cover plate is provided with a downwardly extending flange 21 upon its lower side that is arranged concentric with the axis of the seed plate and upon which is journaled agitator ring 22, the periphery of which is preferably of ogee form. The ring rests upon the seed plate and is provided with gear teeth 23 upon its inner surface, and its outermost edge revolves close to the inner walls of the seed cells. Motion is transmitted to the agitator ring by means of a pinion 24 journaled upon a depending stud 25 secured to the cover plate and engaging with the teeth 23 and the spur pinion 16. The cover plate, throughout the greater part of its periphery, overlaps the inner upper edge of the agitator ring, and upon one side thereof is provided with an extension 26 that bridges the annular seed receiving channel leading to the seed cells and rests upon the upper surface of the annular ring 6, with its edge close against the wall of the seed hopper. The extension is provided with a centrally arranged rectangular boss portion 27, and upon opposite sides of the boss with circumferentially arranged slotted openings 28.

29 represents a cut-out finger inclined downward and forward toward the seed plate in a direction opposite to the rotative movement thereof, and provided with oppositely disposed trunnion members 30 at its upper end that are adapted to rock in bearings arranged upon opposite sides of the slotted portion of the cover plate, a toe portion 31 at its lower end fitting closely against the lower outer edge of the agitator ring and the surface of the division wall separating the seed cells of the seed plate, and a nose portion 32 forward of its axis that is adapted to contact with the end wall 33 of a box-like casing 34 that is secured to the cover plate by means of bolt 35 passing through the boss 27, the side walls of the casing engaging with the side of the rectangular boss member in a manner to prevent the casing from turning about the securing bolt.

36 represents a compression spring operative between the upper wall of the casing and the upper end of the cut-out finger between the trunnions and nose portion in a manner to yieldingly press the toe portion thereof toward the seed plate, the nose portion thereof being operative to limit a rocking movement of the finger in the same direction. The cut-out finger operates to prevent such portion of the seed that is not received by the seed cells from passing under the casing, and the agitator ring, rotating in an opposite direction to that of the seed plate, prevents the seed from massing in front of the cut-out finger.

The plate 5 is provided with a seed delivery opening 37 in rear of the cut-out finger and adapted to register with the seed cells as they are successively brought into communication therewith by the rotation of the seed plate, and 38 represents a seed ejecting finger provided with trunnions like those upon the cut-out finger and similarly arranged, having a toe portion 39 that is adapted to project into and eject the kernels of corn from the seed cells as the latter are brought in communication with the seed delivery opening.

40 represents a compression spring operative between the upper end of the finger, in rear of its axis, and the upper wall of the casing in a manner to yieldingly press the toe of the finger toward the seed plate. The rear end wall of the casing 34 extends rearward and downward in rear of the ejector finger and partially closes the channel between the ring 6 and the agitator ring 22, leaving a small gap 41 between its lower end and the upper surface of the seed plate sufficient to permit the egress from the casing of such kernels as may have been accidentally carried beyond the ejector finger.

The casing 34 is provided with bearing portions 42 that receive the upper halves of the trunnions upon the cut-out and ejector fingers in a manner to coöperate with the bearings therefor in the extension of the cover plate to retain the fingers in operative position. The seed plate is given a rotative movement in one direction and, through the intermediate pinion, transmits a rotary movement to the agitator ring in an opposite direction, as shown by the arrows in Fig. 7.

What I claim as my invention, and desire to secure by Letters Patent, is:

1. A corn planter including, in combination, a seed hopper, a seed plate mounted in the bottom of said hopper and having seed receiving cells upon its periphery, means for transmitting rotary movement to said seed plate, a seed agitating ring mounted in the seed hopper above said seed plate concentric with the axis thereof, having its periphery adjacent said seed receiving cells, and means coöperating with said seed plate for transmitting rotary movement to said ring in an opposite direction relative to the movement of said seed plate.

2. A corn planter including, in combination, a seed hopper, a rotatable seed plate mounted in the bottom of said hopper and having seed receiving cells upon its periphery, means for transmitting rotary movement to said seed plate, a cover plate secured to the wall of said hopper above said seed plate, a seed agitating ring rotatably mounted upon the bottom of said cover plate between said seed plate and said cover plate concentric with the axis of the seed plate, having its periphery adjacent said seed receiving cells, means engaging directly with said rotatable seed plate and with said ring and operative to transmit rotary movement to said ring in a direction opposite to that of said seed plate, and a seed cut-out and seed ejector mechanism carried by said cover plate.

SAMUEL K. DENNIS.

Witnesses:
 EVAN EVANS,
 HERBERT DEKKER.

Copies of this patent may be obtained for five cents each, by addressing the "Commissioner of Patents, Washington, D. C."